United States Patent [19]

Muramoto

[11] Patent Number: 4,843,577
[45] Date of Patent: Jun. 27, 1989

[54] ELECTRONIC CLINICAL THERMOMETER

[75] Inventor: Yutaka Muramoto, Fujinomiya, Japan

[73] Assignee: Terumo Kabushiki Kaisha, Tokyo, Japan

[21] Appl. No.: 21,775

[22] Filed: Mar. 4, 1987

[30] Foreign Application Priority Data

Mar. 4, 1986 [JP] Japan .................................. 61-45326

[51] Int. Cl.⁴ ........................... G01K 1/00; G01K 3/00
[52] U.S. Cl. ............................. 364/557; 364/551.01; 364/413.03; 364/581; 374/169; 374/170; 374/102; 128/736
[58] Field of Search .......... 364/550, 551, 557, 413.02, 364/413.03, 577, 581, 551.01; 374/102, 103, 107, 136, 137, 169–172; 73/432.1; 128/736

[56] References Cited

U.S. PATENT DOCUMENTS

| 3,702,076 | 11/1972 | Georgi | 374/169 |
| 3,877,307 | 4/1975 | Georgi | 73/432.1 X |
| 3,942,123 | 3/1976 | Georgi | 374/169 X |
| 3,978,325 | 8/1976 | Goldstein et al. | 374/169 |
| 4,092,863 | 6/1978 | Turner | 374/169 |
| 4,541,734 | 9/1985 | Ishizaka | 374/172 X |
| 4,559,954 | 12/1985 | Murase | 374/107 X |
| 4,574,359 | 4/1986 | Ishizaka et al. | 364/557 |
| 4,592,000 | 5/1986 | Ishizaka et al. | 374/102 X |
| 4,629,336 | 12/1986 | Ishizaka | 374/169 |
| 4,727,500 | 2/1988 | Jackson et al. | 374/102 X |

FOREIGN PATENT DOCUMENTS

| 0234236 | 9/1987 | European Pat. Off. | 374/169 |
| 2538108 | 6/1984 | France. | |
| 2122756 | 1/1984 | United Kingdom. | |
| 2122784 | 1/1984 | United Kingdom. | |
| 2133562 | 7/1984 | Untied Kingdom. | |

Primary Examiner—Parshotam S. Lall
Assistant Examiner—Joseph L. Dixon
Attorney, Agent, or Firm—Frishauf, Holtz, Goodman & Woodward

[57] ABSTRACT

A predicting-type electronic clinical thermometer in which displayed temperature rapidly attains an equilibrium temperature before the temperature actually sensed does. The thermometer stores a weighting function, in which elapsed measurement time is a variable, prescribing a predetermined change in weighting. When temperature is being sensed, weighting based on the weighting function is applied to a difference value between the sensed body temperature and a predicted value of equilibrium temperature obtained based on the sensed body temperature. The temperature displayed is caused to make a smooth transition from the start of temperature detection to the final equilibrium temperature by adding the weighted difference value to the sensed temperature.

4 Claims, 8 Drawing Sheets

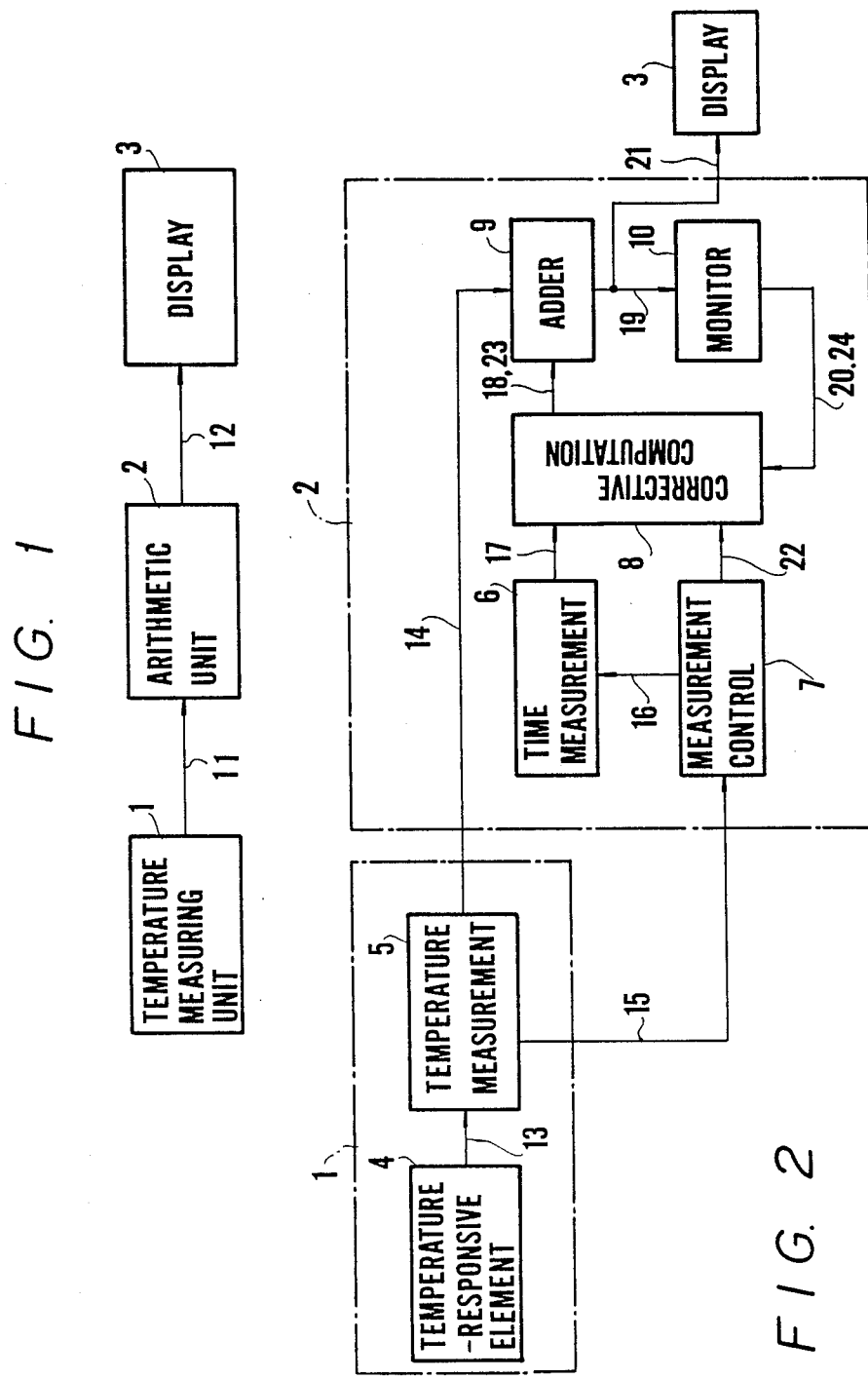

ELECTRONIC CLINICAL THERMOMETER

BACKGROUND OF THE INVENTION

1. Related U.S. Patent Application

U.S. patent applications directly or indirectly related to the subject application are the following:

U.S. Pat. No. 4,541,734, issued Sept. 17, 1985 by Hideo Ishizaka, entitled Electronic Clinical Thermometer, and Method of Measuring Body Temperature;

Pat. No. 4,592,000, issued May 27, 1986 by Hideo Ishizaka, entitled Electronic Clinical Thermometer, and Method of Measuring Body Temperature;

Pat. No. 4,574,359, issued Mar. 4, 1986 by Hideo Ishizaka, entitled Electronic Clinical Thermometer, and Method of Measuring Body Temperature; and Ser. No. 748,663, filed June 24, 1985 now U.S. Pat. No. 4,629,336 by Hideo Ishizaka, entitled Electronic Clinical Thermometer, and method of Meauring Body Temperature.

2. Field of the Invention

This invention relates to an electronic clinical thermometer and, more particularly, to a predicting-type electronic clinical thermometer in which a displayed temperature reading rapidly attains an equilibrium temperature even before temperature is sensed in real time.

3. Description of the Prior Art

The advantage of an electronic clinical thermometer which predicts temperature that will be attained at thermal equilibrium is that the equilibrium temperature is displayed at an early stage during the course of measurement. In an electronic clinical thermometer of this type, the early display of temperature is achieved by sensing temperature, obtaining a difference value between the sensed temperature and a predicted value of equilibrium temperature determined on the basis of the sensed temperature, and adding the difference value to the sensed temperature. This difference value shall be referred to as an "add-on value" hereinafter.

However, when predictive calculations are performed to obtain results immediately after the thermometer is brought into contact with the part of the body to be measured, the displayed predicted value resulting from the calculations is unstable owing to the steep shape of the body temperature detection curve just after the thermometer makes contact. After passage of a sufficient length of time, the add-on value for the temperature prediction becomes substantially zero and the equilibrium temperature is virtually attained. It is required that the display show a smooth transition from the predicted value to the equilibrium temperature value.

SUMMARY OF THE INVENTION

An object of the present invention is to provide an electronic clinical thermometer in which the displayed value of temperature rises smoothly immediately after the thermometer makes contact with the body, and in which equilibrium temperature is rapidly attained even before equilibrium temperature is sensed in real time.

Another object of the present invention is to provide an electronic clinical thermometer in which a displayed temperature value makes a smooth transition from a displayed value of predicted equilibrium temperature to a displayed value of sensed real-time temperature a sufficient period of time after the thermometer makes contact with the body.

According to the present invention, the foregoing objects are attained by providing an electronic clinical thermometer comprising temperature sensing means for sensing body temperature at a prescribed part of a body, predicting arithmetic means for poredicting a final, stable temperature based on the sensed body temperature, arithmetic means for calculating a difference value between the sensed body temperature and the predicted final, stable temperature, memory means for storing a weighting function, in which elapsed measurement time is a variable, prescribing a change in weighting applied to the difference value, weighting means for obtaining a display temperature by adding the difference value, which has been weighted in accordance with the weighting function, to the sensed body temperature, control means which clocks elapsed measurement time for controlling said temperature sensing means and said weighting means at sampling instants, and display means for displaying the obtained display temperature.

According to an embodiment of the invention, the predicting arithmetic means stores a plurality of temperature prediction functions in which elapsed measurement time is a variable, each function prescribing a temperature change up to a final, stable temperature.

In another embodiment of the invention, the weighting function exhibits an increasing characteristic up to a weighting of 100% over a period from the start of measurement until a first predetermined time.

In a further embodiment of the invention, the weighting function exhibits an increasing characteristic up to a weighting of 100% over a period from the start of measurement until a first predetermined time, a level characteristic wherein the weighting of 100% is maintained over a period from the first predetermined time to a second predetermined time, and a decreasing characteristic wherein the weighting decreases from 100% to 0% over a period from the second predetermined time to a third predetermined time.

It should be noted that the term "weighting" as used herein refers to adding the difference value to the sensed body temperature after weighting the difference value in accordance with a certain decided time function, the adjustment being made with the passage of time in conformance with the sensed body temperature.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the basic construction of an electronic clinical thermometer according to the present invention;

FIG. 2 is a block diagram illustrating, in some detail, the construction of the electronic clinical thermometer of FIG. 1 according to an embodiment of the present invention;

DESCRIPTION OF THE PREFERRED EMBODIMENT

Figure 3:
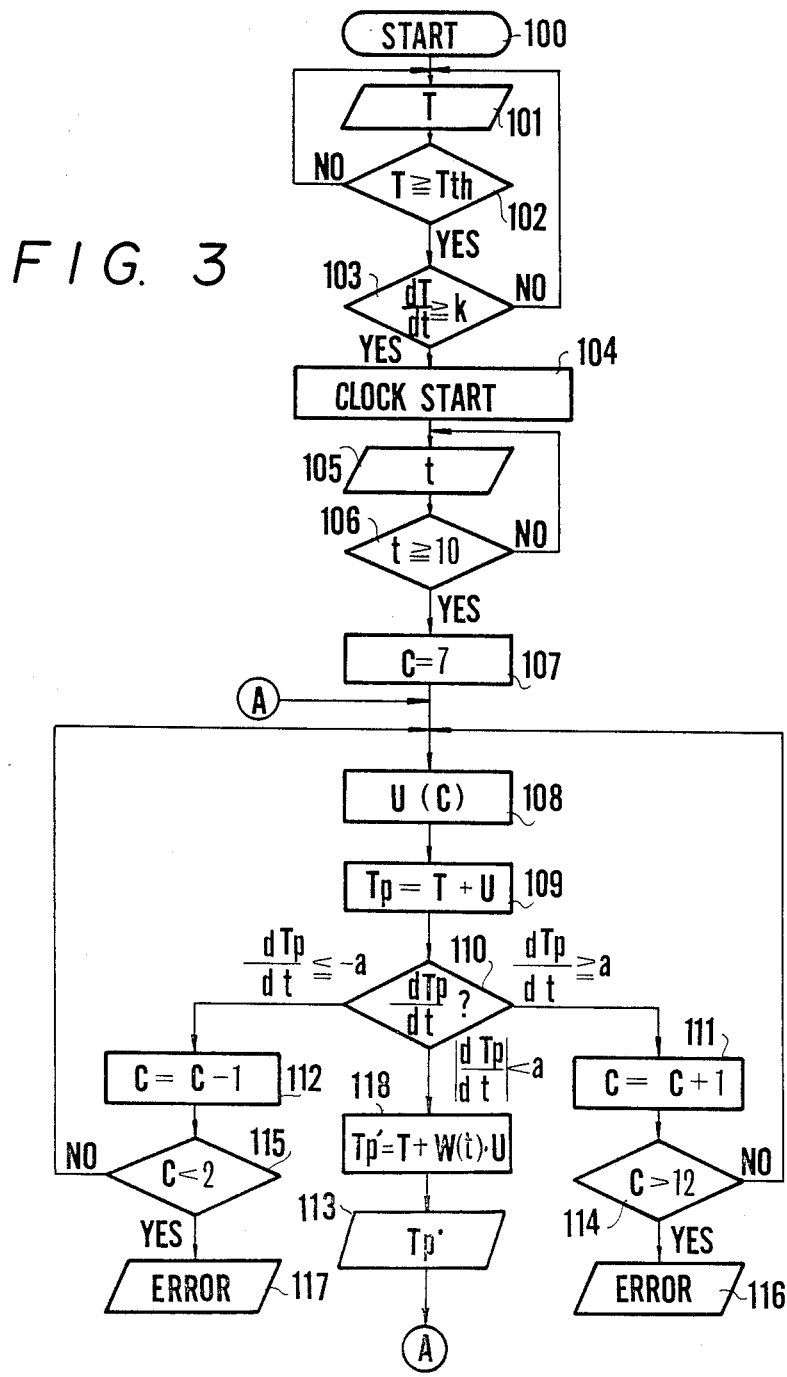
FIG. 3 is a flowchart indicating a process through which temperature is predicted at thermal equilibrium in an armpit of a subject.

Reference will now be had to the block diagram of FIG. 1 showing the basic construction of an electronic clinical thermometer according to the present invention. The electronic clinical thermometer includes a temperature measuring unit 1, an arithmetic unit 2 for predicting temperature that will be attained at thermal equilibrium, and a display unit 3 for displaying the predicted temperature after it has been weighted.

The temperature measuring unit 1 is constituted by circuitry, having a temperature responsive element 4 (FIG. 2) such as a thermister, for real-time temperature measurement of a part of the human body. The arithmetic unit 2 is composed of circuitry for predicting, substantially continuously, the temperature that will be attained at thermal equilibrium. Specifically, the arithmetic unit 2 operates by monitoring, substantially continuously, a signal 11 produced by the temperature measuring unit 1, determining conditions for starting prediction, initiating the prediction operation, subsequently predicting the temperature attained at thermal equilibrium constantly at short time intervals using the latest information, such as a time signal obtained from an internally provided elapsed time measurement function, in addition to the signal 11 continuously provided by the temperature measurement unit 1, continuously evaluating the suitability of the prediction and concurrently executing weighting processing so that the displayed value of predicted temperature will make a smooth transition, and delivering a resulting prediction signal 12 to the display unit 3 substantially continuously until thermal equilibrium is attained. The display unit 3 provides a visual, numeric indication of temperature obtained as a result of the weighting processing.

FIG. 2 is a block diagram illustrating in some detail the construction of an embodiment of an electronic clinical thermometer according to the present invention. In FIG. 2, like reference numerals denote like or corresponding parts in the electronic clinical thermometer of FIG. 1. It should be noted that the individual elements constituting the arithmetic unit 2 specify, in the form of the labeled blocks, respective functions implemented by a program (see FIGS. 3 and 8) stored in the read-only memory (ROM) of a general-purpose microcomputer. By reading the description thereof given hereinafter, those skilled in the art will be capable of readily understanding the construction and operation of the invention to a degree necessary for working the same.

The temperature measuring unit 1 comprises a temperature responsive element 4 such as a thermister, and a temperature measuring circuit 5. The latter, which receives an electric signal 13 indicative of sensed body temperature received from the temperature responsive element 4, is operable to sample and convert the signal 13 into digital output signals 14, 15 indicative of real-time temperature.

The arithmetic unit 2 for predicting temperature comprises a measurement control circuit 7, a time measuring circuit 6, a corrective value computing circuit 8, an adding circuit 9 and a predicted temperature monitoring circuit 10. The measurement control circuit 7 controls the overall operation of the electronic clinical thermometer. This is achieved by constantly monitoring the real-time temperature signal 15 from the temperature measuring circuit 5, and supplying the time measuring circuit 6 with a clock signal 16 and the corrective value computing circuit 8 with a control signal 22 when predetermined measurement conditions are satisfied.

Figure 6:
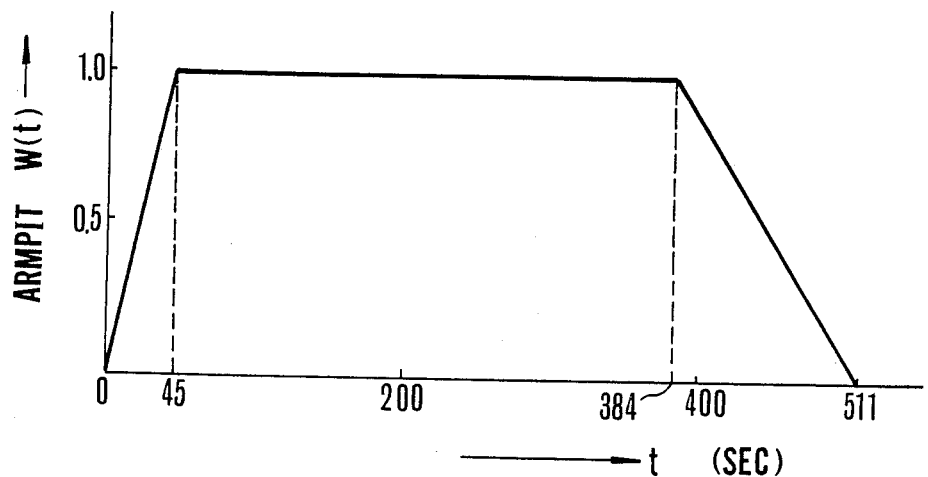
FIG. 6(a) is a graph indicating weighting set for an electronic clinical thermometer used in an armpit.
FIG. 6(b) is a graph indicating weighting set for an electronic clinical thermometer used orally.
Figure 6:
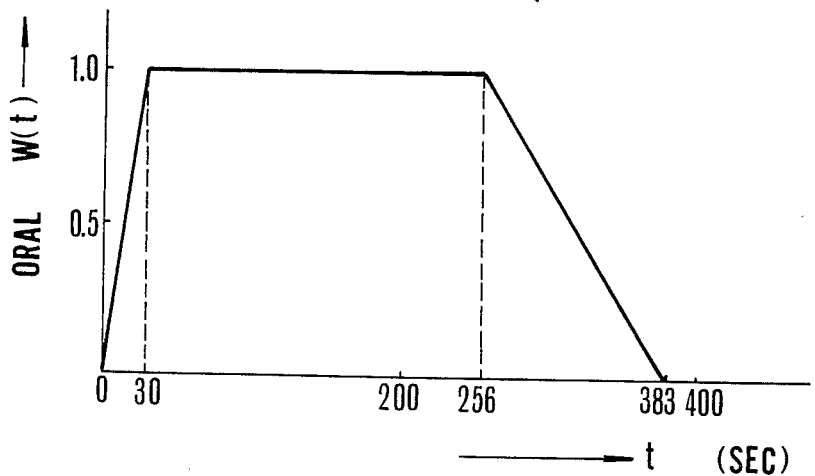

The time measuring circuit 6 responds to the clock signal 16 by clocking elapsed time from the start of measurement, and producing a signal 17 indicative of the elapsed time. The corrective value computing circuit 8 computes, and produces a signal 18 indicative of, a corrective temperature differential (add-on value) U for temperature predicting purposes, the value of U being the difference between real-time temperature and temperature attained at thermal equilibrium, in accordance with temperature sensed at sampling instants based upon an input of the elapsed time signal 17. The corrective value computing circuit 8 also produces a display corrective value signal 23 obtained by weighting the corrective signal 18. The corrective value computing circuit 8 incorporates a function for obtaining the corrective temperature differential as a function of elapsed time. The function includes several parameters which influence the corrective temperature differential. These parameters are set at the initiation of measurement, for example when a control signal 22 from the measurement control circuit is first applied to the computing circuit 8, so as to take on specific values, e.g. values defined such that a temperature rise with elapsed time will be the most likely average temperature change, which is obtained statistically in advance by an actual measurement. As will be described later, the corrective value computing circuit 8 has three functions. The first is to compute the corrective temperature differential corresponding to the elapsed time signal 17 input thereto, the output signal 18 being indicative of the computed value. The second function is to alter, upon receiving a negative feedback control signal 20 from the predicted temperature monitoring circuit 10, the values of the parameters which influence the corrective temperature differential, namely the function for obtaining the corrective temperature differential. The third function is to subject the corrective temperature differential to a weighting operation which is a function of elapsed measurement time, as shown in FIGS. 6(a), (b), thereby outputting the display corrective value signal 23 for the display of predicted temperature.

The adding circuit 9 adds the real-time temperature signal 14 and the corrective signal 18, producing a predicted temperature signal 19, which is the sum of the real-time temperature and the corrective temperature differential for predicting purposes. The adding circuit 9 also adds the real-time temperature signal 14 and the display corrective value signal 23, producing a predicted display temperature signal 21, which is the sum of the real-time temperature and the corrective temperature differential for display purposes. The predicted temperature monitoring circuit 10 monitors the signal 19 constantly and decides whether the predicted temperature is within prescribed limits for a prescribed period of time. The monitoring circuit 10 outputs the negative feedback control signal 20 to the computing circuit 8 when the predicted temperature is outside these limits, and outputs a display control signal 24 to the computing circuit 8 for activating the temperature display when said temperature is within the prescribed limits.

In the temperature measuring unit 1, the electric signal 13 from the temperature responsive element 4 is applied to the temperature measuring circuit 5 where the signal 13 is converted into the signals 14, 15, which are capable of being converted into real-time temperature. The output signal 15 of the temperature measuring circuit 5 is monitored constantly by the measurement control circuit 7, which immediately applies the clock signal 16 to the time measuring circuit 6 when predetermined conditions are satisfied, e.g. when the signal indicates that a certain temperature has been exceeded at a temperature change in excess of a certain value. At the same time, the control circuit 7 applies the control signal 22 to the corrective value computing circuit 8, thereby giving an instruction for computation to begin.

The corrective value computing circuit 8, upon receiving as an input the elapsed time signal 17 from the time measuring circuit 6, computes the corrective temperature differential for predicting final temperature, this value being the difference between real-time temperature and temperature attained at thermal equilibrium. The signal 18 indicative of the corrective value is applied to the adding circuit 9. As mentioned above, the corrective temperature differential is incorporated in the corrective value computing circuit 8 as a function solely of elapsed time t including several parameters which influence the corrective temperature differential. These parameters are reset at the initiation of measurement, for example when the control signal 22 from the measurement control circuit is first applied to the corrective value computing circuit 8 (the signal 22 being applied at the same time that the clock signal 16 is applied to the measurement control circuit 6), so as to take on a values which define a specific temperature change. The corrective value computing circuit 8 computes the corrective temperature differential as soon as the elapsed time signal 17 arrives, and delivers the corrective value signal 18 to the adding circuit 9.

The adding circuit 9 receives and takes the sum of the real-time temperature signal 14 and the corrective value signal 18, producing the predicted temperature signal 19 which is the sum of the corrective temperature differential and real-time temperature. The signal 19 is applied as an input to the predicted temperature monitoring circuit 10, which monitors the predicted temperature constantly. When the predicted temperature is constant for a certain period of time, the monitoring circuit 10 regards the results of the corrective temperature value computation performed by the computing circuit 8 as being appropriate. In other words, when the predicted temperature is determined to be constant for a certain time period, the monitoring circuit 10 decides that the selection of the computation process, function and parameter applied in the computation of the corrective temperature value are appropriate. When such is the case, the display control signal 24 is delivered to the corrective value computing circuit 8 and the predicted display temperature signal 21 is produced and applied to the display unit 3. When the predicted temperature falls outside, say, a fixed range of temperature variation within a predetermined period of time, the monitoring circuit 10 applies the negative feedback control signal 20 to the corrective value computing circuit 8. The latter responds by implementing the abovementioned second function thereof, namely by altering the parameters which influence the corrective temperature differential. Thus, the corrective value computing circuit 8 recomputes the corrective temperature differential, conforming to the elapsed time signal 17, based on the altered parameters. The corrective signal 18, which is the result of this computation, is again applied to the adding circuit 9, the latter producing the predicted temperature signal 19 which is monitored by the predicted temperature monitoring circuit 10.

The predicted temperature monitoring circuit 10 repeats the foregoing process, with the result being that the weighted predicted temperature is displayed by the display unit 3. The foregoing series of process steps, namely the computation of the corrective temperature differential by the computing circuit 8, the addition operation performed by the adding circuit 9, the monitoring of the predicted temperature by the monitoring circuit 10, the negative feedback applied from the monitoring circuit 10 to the computing circuit 8, and the weighting processing executed when the display is made, are performed in a short period of time, and the predicted temperature displayed on the display circuit 3 is presented substantially continuously and makes a smooth transition.

Next will be described the process through which temperature reached on attainment of thermal equilibrium is predicted with the embodiment of FIG. 2. For the discussion, reference will be had to the flowchart of FIG. 3 and the corrective temperature differential curves illustrated in FIG. 4.

The first item requiring discussion is the corrective temperature differential, represented by U. In measuring body temperature, the form of temperature change from the start of measurement until the attainment of thermal equilibrium differs widely depending upon the thermal characteristics of the clinical thermometer, the state of the part of the body where the temperture is sensed, and the part itself. If the thermal characteristics of the clinical thermometer are limited, however, then the various temperature change patterns can be classified into a number of categories. In other words, placing a limitation upon the thermal characteristics will make it possible to define a number of temperature change patterns. Two major categories of temperature change are those resulting from, say, measurement orally and measurement by placement of the thermometer in an armpit. Several other categories may also be conceived, such as temperature change patterns exhibited by adults and children, but these are not particularly useful. Let us consider measurement of body temperature sensed in an armpit.

It is known from measurement of armpit temperature for a wide variety of cases that approximately ten minutes is required for attainment of thermal equilibrium. Let U* represent the difference between temperature Te at thermal equilibrium and a temperature T during measurement. Upon investigation, it is found that U* is expressed with good accuracy by the following formula:

$$U^* = Te - T = \alpha t + \beta + C(t+\gamma)^\delta \tag{1}$$

where:

U* : difference between equilibrium temperature and temperature during measurement t: time from beginning of measurement
C: variable parameter
$\beta_0$, $\beta$, $\gamma$, $\delta$: constants in conformance with measurements taken under constant conditions. In particular, for measurement of body temperature in an armpit, the following holds with good regularity:

$$U^* = -0.002t + 0.25 + C(t+1)^{-0.6} \quad (2 \leq C \leq 12) \quad (2)$$

where t is measured in seconds and U* in degrees Centigrade.

Figure 4:
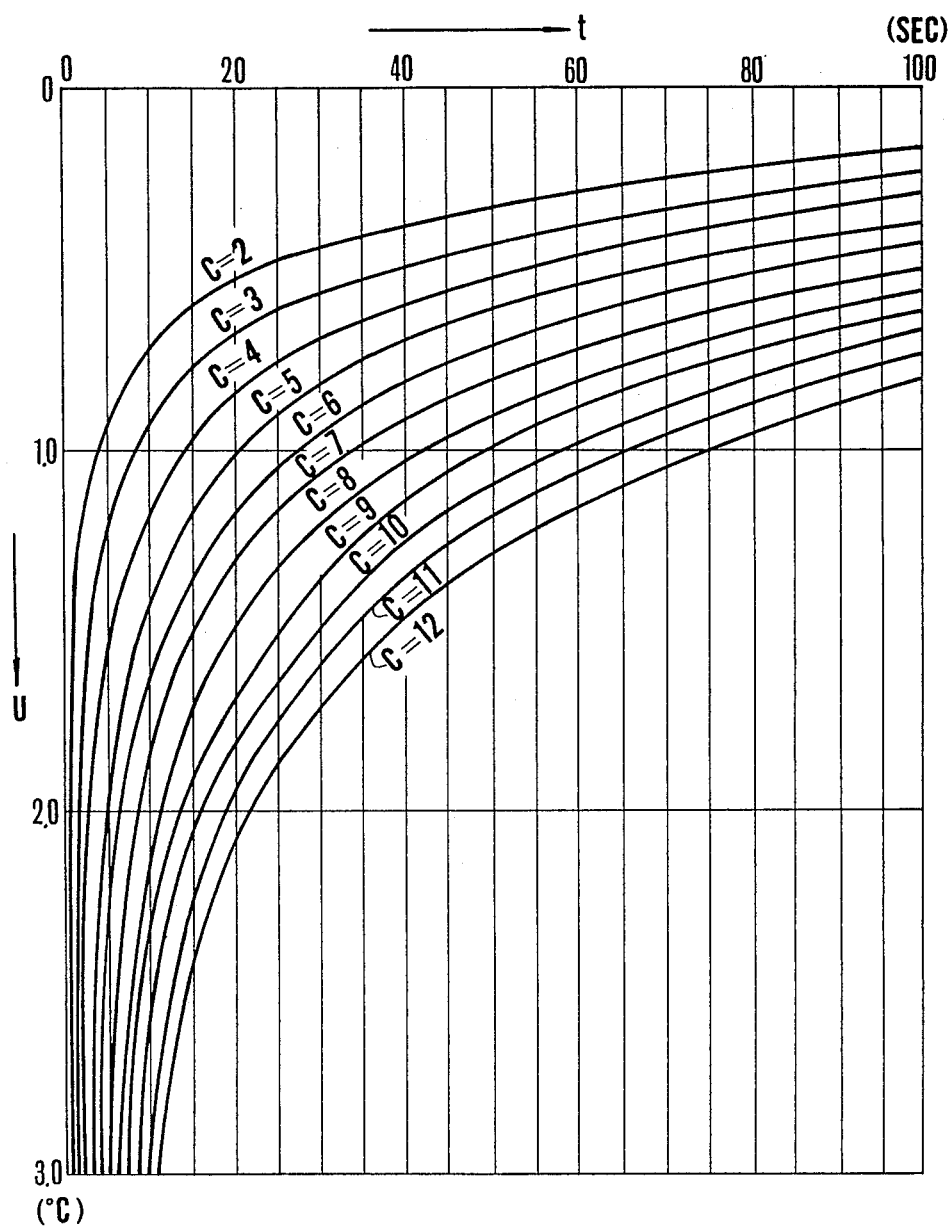
FIG. 4 is graph illustrating a corrective temperature differential curve according to an embodiment of the invention.

When U* in Eq. (2) is replaced by U and the value of the parameter is varied from C=2 to C=12, the curves shown in FIG. 4 are the result. The reason for replacing U* with U is that the equilibrium temperature Te corresponds to a predicted temperature Tp as far as execution of the prediction process is concerned. In other words, the corrective temperature differential U during the prediction process is given by the following equation:

$$\begin{aligned} U &= Tp - T \\ &= -0.002t + 0.25 + C(t+1)^{-0.6} \; (2 \leq C \leq 12) \end{aligned} \quad (3)$$

FIG. 3 is a flowchart of an algorithm describing the processing for temperature measurement as carried out by, say, the arrangement illustrated in the block diagram of FIG. 2.

With the start step 100, power is introduced to the system to actuate the temperature measuring circuit 5 (FIG. 2), upon which the process moves to a temperature measurement step 101. In this step, the signal 15 from the temperature measuring circuit 5 is monitored by the measurement control circuit 7. In decision steps 102, 103 it is decided whether or not a measurement of body temperature is to be performed. Specifically, in step 102, it is decided whether a predetermined temperature, say a temperature of 30° C., has been exceeded. Step 103 decides whether the temperature rise is equal to or greater than 0.1° C. per second. Both of these decisions are executed by the measurement control circuit 7. If an affirmative decision is rendered in both cases, then the process moves to a step 104 for reset start of the time measurement circuit 6.

In step 104, a counter in the time measuring circuit 6 for measuring elapsed time is reset by the first clock signal 16 generated by the measurement control circuit 7 and, at the same time, an elapsed time measurement begins in step 105. Step 106 is a decision step which calls for waiting a certain period of time until a subsequent temperature prediction step takes on practical meaning. For example, the system waits in standby for ten seconds until start of a computation for a corrective temperature. The reason is that the accuracy of temperature prediction is extremely poor, and would give unsatisfactory results, for a period of less than ten seconds.

Figure 5:
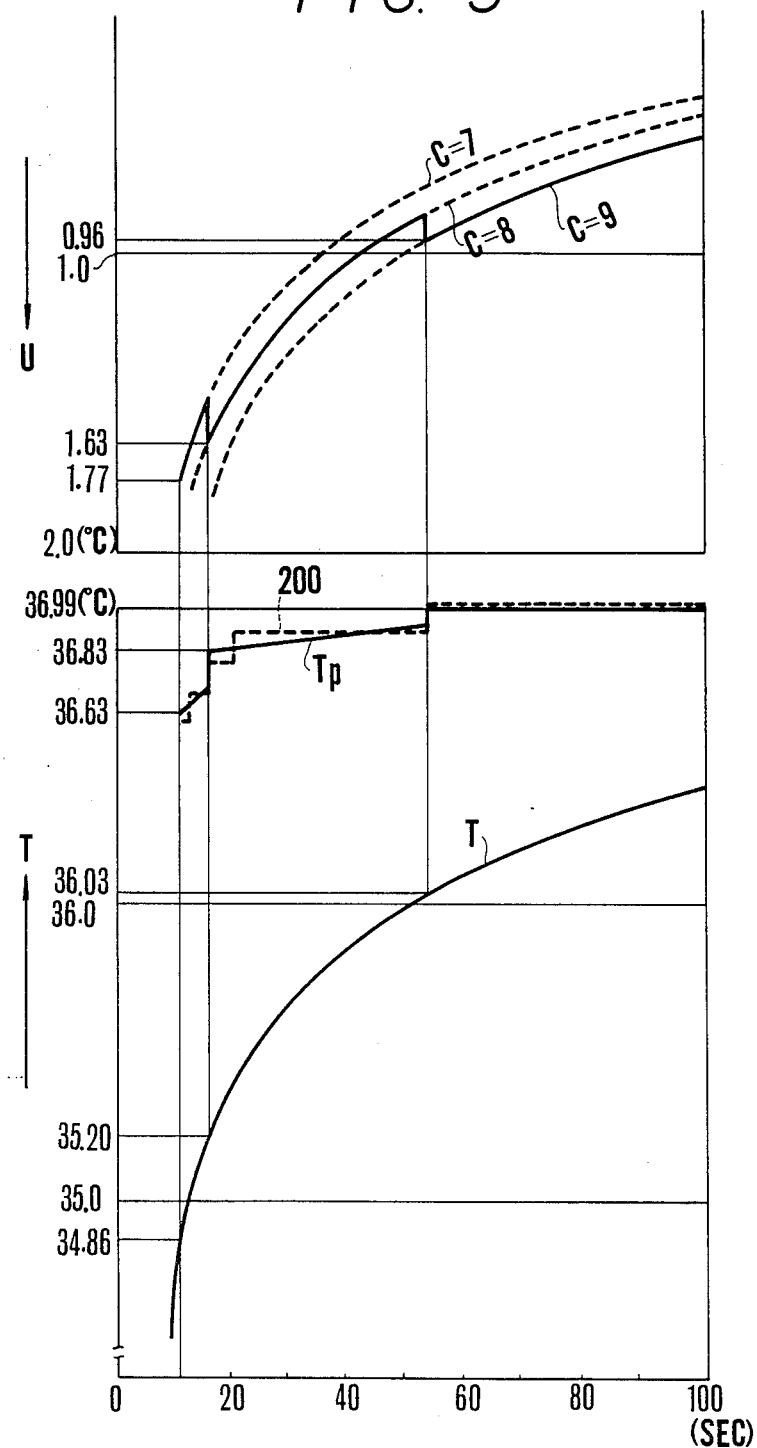
FIG. 5 is a graph illustrating a predicted temperature transition.

When measured results are available for an elapsed time of ten seconds or more, the measurement control circuit 7 produces the control signal 22, which executes an initial setting step 107. In this step, the parameter C of the arithmetic expression incorporated in the corrective temperature value computing circuit 8 is set to a value having the highest probablity of leading to a temperature prediction at thermal equilibrium, this being obtained statistically by performing actual measurements in advance. In the illustrated embodiment, C=7 in step 107. Next, step 108 calls for computation of the corrective temperature value within the computing circuit 8, the latter supplying the adding circuit 9 with the signal 18 indicative thereof. The computation performed by the computing circuit 8 corresponds exactly to Eq. (3) above. The first computation gives as results a point on the curve marked C=7 in FIG. 4 and on the curve marked C=7 in FIG. 5. Accordingly, for t=11 sec, we have U=1.77° C. This is applied to the adding circuit 9 as the corrective value signal 18.

Step 109 calls for the adding circuit 9 to add the real-time temperature signal 14 and the corrective value signal 18 and deliver the sum to the predicted temperature monitoring circuit 10 as the predicted temperature signal 19. For example, since U=1.77° C. in the present example, and if T=34.86° C., Tp=36.63° C. will be applied to the monitoring circuit 10 by the adding circuit 9 upon performing the addition $Tp = T + U$. The monitoring circuit 10 will receive two values of the predicted temperature Tp at a certain time interval for the same value of C. In a decision step 110, therefore, the predicted temperature Tp is investigated for any increase or decrease from one arrival to the next.

Three decisions are capable of being rendered in step 110 by comparing the change in Tp with a certain value a. If the decision is $dTp/dt \geq a$, this indicates that an equilibrium temperature higher than that predicted at the present time can be expected. Accordingly, the process moves to a step 111 to increase the value of the parameter C. If the decision is $dTp/dt \leq -a$, then this indicates that an equilibrium temperature lower than that predicted at the present time can be expected. The process therefore moves to a step 112 to decrease the value of the parameter C. For $|dTp/dt| < a$, the indication is that the equilibrium temperature predicted at the present time lies within limits where said temperature can be regarded as being approximately equal to the equilibrium temperature predicted previously. Therefore, the selected temperature prediction function is deemed to be on the right track for a real-time temperature measurement, and processing moves to step 118 for forming a predicted display temperature.

In steps 111, 112, the negative feedback control signal 20 from the monitoring circuit 10 is applied to the corrective value computing circuit 8 to change the parameter C. The value of the new parameter C is checked within the computing circuit 8 in accordance with steps 114, 115 and is used as the parameter in step 108 for recomputation of the corrective value providing that upper and lower limits are not exceeded, i.e. provided that the increased parameter C does not exceed the set upper limit value 12 in decision step 114, and that the decreased parameter C does not fall below the set lower limit value 2 in decision step 115. The step 118 calls for weighting (described later) to be performed in order to form the predicted display temperature. The display step 113 calls for the presently prevailing predicted display temperature signal 21 to be outputted by the adder 9 so that the predicted display temperature at the present point in time may be displayed by the display unit 3. When step 113 ends, the process returns to the corrective value computation step 108 while the predicted temperature remains displayed on the display unit 3. Thus, the predicted temperature is displayed on the display unit, after such processing as rounding to the nearest whole number, only when the condition $|dTp/dt| < a$ is satisfied. The displayed value is retained until the next display step. The processing indicated by the loops composed of steps 108 through 115 is controlled by the measurement control circuit 7 so as to be repeated at a predetermined interval of, say, one second. When the upper limit C=12 in decision step 114 or the lower limit C=2 in the decision step 115 is exceeded, step 116 or 117 calls for a display to inform the operator of an error. Such a display indicates that the thermometer has been shifted during measurement, that a measurement is proceeding abnormally, or that some other problem has arisen.

In the example of FIG. 3, the algorithm alters the value of the parameter C in increments or decrements of one. In such case the resolution of the predicted temperature will be on the order of 0.1° C. at about 50 seconds into the prediction computations. To obtain even greater resolution, therefore, the value of the parameter C should be incremented or decremented by 0.5 in steps 111 or 112. Further, the value of a in the decision step 110 need not be constant. It can, for example, be a function the value whereof diminishes with time. Such an expedient is preferred in view of the fact that the temperature difference separating one corrective temperature curve from another in FIG. 4 grows smaller with the passage of time. To compute dTp/dt, obviously various methods are conceivable using a running average or three values of Tp separated widely in time, so long as there is no significant influence upon the accuracy of measurement. In any case, even when the display step 113 is eventually selected as the result of the decision in step 110, processing returns to step 110 through the corrective value computation step 108 and adding step 109 for computation of Tp. During the repeated execution of this loop, the computation for predicting temperature is regarded as following the actual temperature change. Accordingly, the computed value of the predicted equilibrium temperature will stabilize and the displayed value thereof will make a smooth and rapid transition. The corrective value U will follow e.g. the curve C=7 in FIG. 5.

At time t=16 sec, the decision rendered in step 110 is dTp/dt≧a, after which the process moves to step 111 where the parameter C is incremented to 8. On the curve C=8, we will have U=1.63° C. If T=35.20° C. at such time, then the result of computation in step 109 will be Tp=36.83° C. Now, in accordance with step 110, two values of the predicted temperature (i.e. two values taken at a certain time interval), for the same C (=8), are checked. As long as the change in Tp does not exceed a certain value, the loop which includes the display step 113 is stepped through repeatedly, so that a value of Tp in the neighborhood of 36.8° C. is obtained continuously. As will be described below, weighting at this time is 36%, so that the substantial display tempratue is lower than 36.8° C. At time t=53 sec, the program proceeds to the loop decided by dTp/dt≧a, so that the curve tracked is indicated by C=9. Since U=0.96° C., T=36.03° C. will now hold, the result of calculation in step 110 will be Tp=36.99° C. As will be described below, weighting at this time is 100%, so that the substantial display temperature is 36.99° C. From this point onward the prediction of temperature proceeds along the curve C=9. The value of Tp being rounded off is as indicated by the dashed line 200 in FIG. 5.

Thus, as described hereinabove, body temperature which will prevail at thermal equilibrium is predicted and displayed substantially continuously.

In the algorithm illustrated in FIG. 3, the parameter C is intially set to the value of 7 in step 107. By doing so, however, there may be instances where the displayed value diminishes with time, owing to the method of processing or the way in which the value of a is selected in the decision step 110 for monitoring the predicted temperature. To give the operator a more natural impression of temperature transition, therefore, C can be set initially to 2 in step 107, so that the displayed value will, in general, rise with the passage of time. Thus, parameter selection causes the equilibrium temperature to be rapidly approached with respect to elapsed measurement time.

FIGS. 6(a), (b) illustrate a change in weighting with respect to elapsed measurement time, in which (a) is a graph of weighting set for temperature measurement in an armpit and (b) is a graph set for temperature measurement taken orally. These graphs are examples of weighting characteristics determined statistically and on the basis of experience taking into consideration differences in the thermal equilibrium characteristics of the part of the body measured.

Generally, sensed temperature immediately after the thermometer is contacted with the body exhibits a steep temperature variation. The abovementioned add-on value for this portion of the temperature curve is large in magnitude. Until the prediction function selected is an appropriate one, therefore, the add-on value also undergoes a discontinuous and large-scale variation due to the changing of the prediction function. Consequently, if the add-on value during this interval of time were added on as is, the predicted temperature display would be unstable and difficult to read. Accordingly, until passage of a predetermined period of time from the start of measurement, the corrective value computing circuit 8 subjects the add-on value (corrective value signal 18) obtained to weighting having a linearly increasing characteristic. For example, if the temperature measurement is taken in the armpit, then weighting having a slope that will raise the add-on value to 100% is applied until 45 seconds elapse from the start of measurement. If the temperature measurement is taken orally, then weighting having a slope that will raise the add-on value to 100% is applied until 30 seconds elapse from the start of measurement.

When the first predetermined time period elapses, the rise in the sensed temperature becomes more gentle and the add-on value for this portion of the curve also falls within a suitable range. From this point onward, the rapidity at which the prediction converges toward the final temperature and the accuracy of the prediction become important factors. Accordingly, when the first predetermined time period elapses, the correcting value computing circuit 8 subjects the add-on value (the corrective value signal 18) obtained to 100% weighting until the elapse of a second predetermined time period. This is equivalent to not executing weighting processing. By way of example, the second predetermined time period is 348 seconds (six minutes and 24 seconds) from the start of measurement in case of armpit measurement and 256 sec (four minutes and 16 seconds) from the start of measurement in case of oral measurement.

When the second predetermined time period elapses, the sensed temperature itself falls within a range close to the equilibrium temperature. When this much time has passed, the merits of performing a prediction diminish and it is better to shift to a direct display-type function. Accordingly, when the second predetermined time period elapses, the corrective value computing circuit 8 subjects the add-on value (corrective value signal 18) to weighting having a linearly decreasing characteristic until passage of a third predetermined time period. By way of example, for measurement taken in an armpit, weighting having a slope for a weighting transition of 100% to 0% is performed from a point 384 seconds after the start of measurement until a point 511 seconds after the start of measurement (8 minutes and 31 seconds). For measurement taken orally, weighting having a slope for a weighting transition of 100% to 0% is performed from a point 256 seconds after the start of measurement until a point 384 seconds after the start of measurement (6 minutes and 24 seconds). The continuity of the displayed temperature is maintained by not suddenly applying 0% weighting in this time interval. In other words, a smooth and gradual transition is made to the direct reading state by gradually reducing the percentage occupied by the add-on value.

When the third predetermined time period elapses, the sensed temperature itself indicates the thermal equilibrium temperature. From this point onward, therefore, the add-on value is 0. The electronic clinical thermometer of the present embodiment thenceforth functions as a conventional direct reading-type clinical thermometer and temperature can be measured until the user is satisfied. The displayed temperature is thus enabled to make a smooth transition with the passage of time. The requirement for a rapid display of predicted temperature as well as an accurate direct reading of temperature is thus satisfied.

Figure 7:
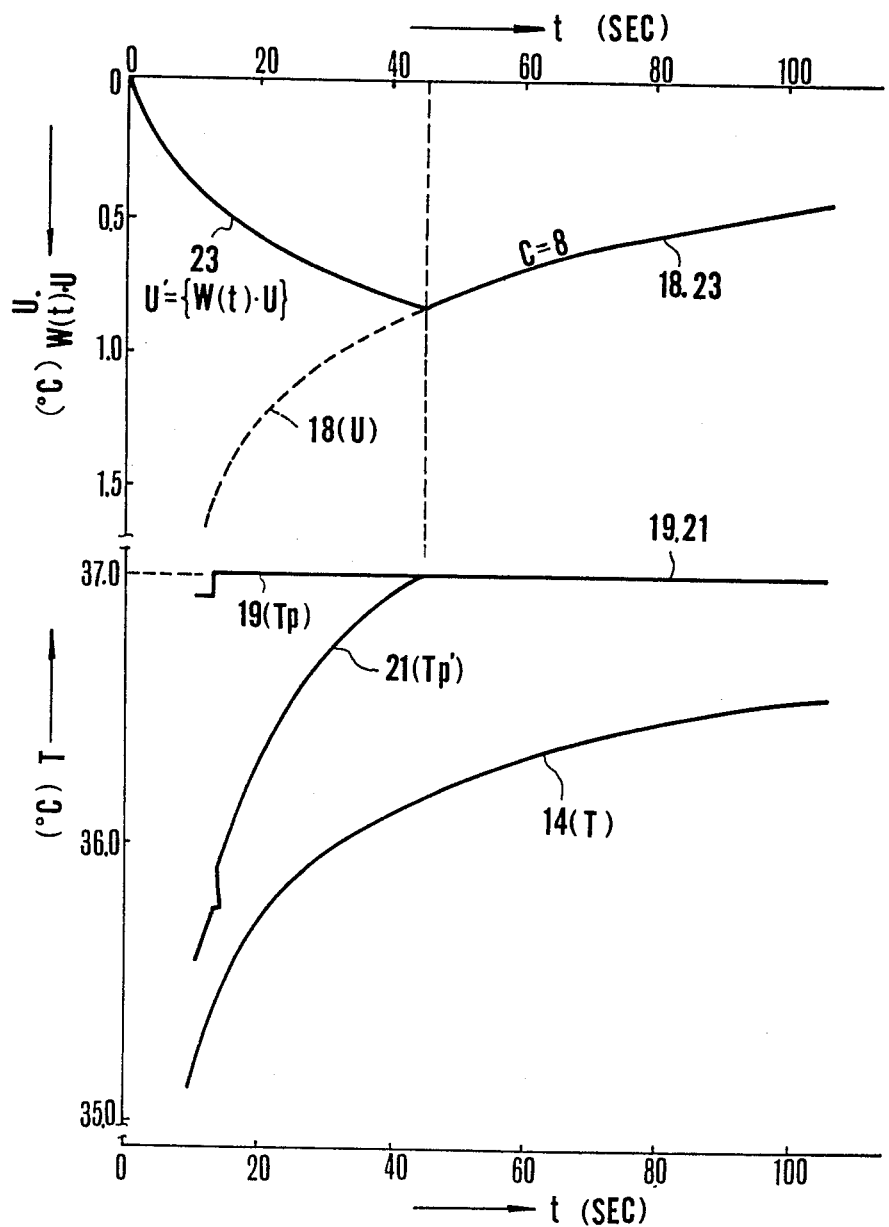
FIG. 7 is a graph useful in describing the transition of a predicted display temperature from the start of measurement in an armpit.

FIG. 7 is a graph useful in describing the transition of a predicted display temperature from the start of measurement in an armpit. By way of example, the prediction function associated with a parameter C=8 being selected at the present point in time is prescribed at the corrective value signal 18, as illustrated in FIG. 7. It will be understood that when the selected parameter C=8 matches the rising curve of the real-time temperature signal 14, the predicted temperature signal 19 rapidly attains the thermal equilibrium temperature. Accordingly, if an appropriate parameter selection is always made, the predicted temperature signal 19 will be displayed, whereby an ideal temperature display is obtained. However, since the initially set value of the parameter C is a statistically determined value having the highest probability of leading to a temperature prediction at thermal equilibrium, the parameter C will not necessarily match the real-time temperature signal 14 at an early time. When matching is not achieved, the predicted temperature signal 19 will probably make an unstable transition due to the changeover of the prediction function. For example, there are cases where the predicted temperature signal initially exhibits a value higher than the equilibrium temperature and then gradually decays, and cases where the predicted temperature signal is initially quite low and then rises sharply. Accordingly, elapsed-time weighting shown in FIG. 6(a) is applied to the add-on value U(t) of the prediction function in the time interval from the start of measurement to the instant 45 seconds thereafter. As a result, the corrective value signal 23 for display purposes is calculated in accordance with $U' = W(t)\,U(t)$, the signal U' starting at a value of 0 and then gradually rising. In the time interval from the start of measurement until 45 seconds thereafter, therefore, the display temperature signal 21 is smaller than the predicted temperature signal 19, rises smoothly and quickly attains the equilibrium temperature before the real-time temperature signal 14. Forty-five seconds after the start of measurement, a continuous, accurate and stable display of equilibrium temperature is achieved.

Figure 8:
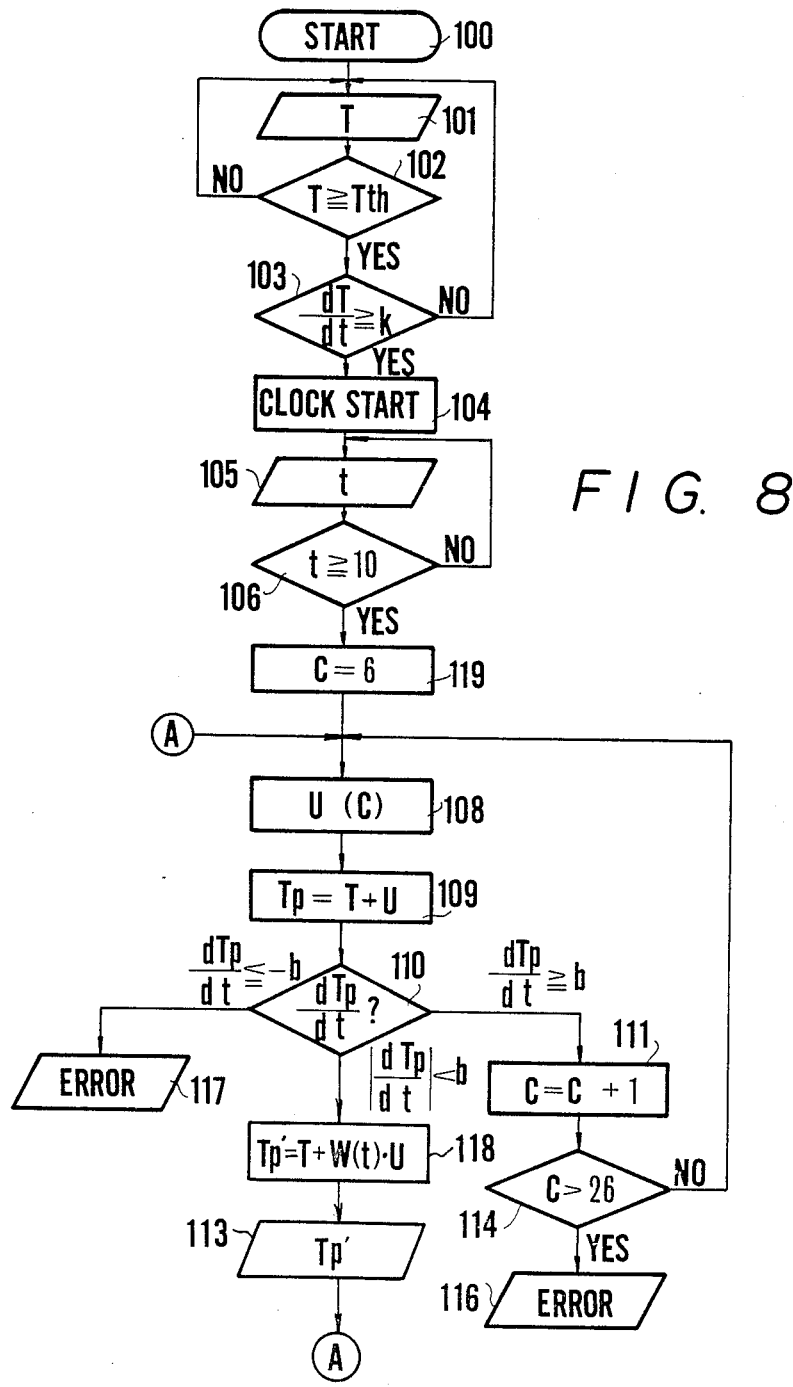
FIG. 8 is a flowchart illustrating a process through which temperature is predicted at thermal equilibrium in the mouth of a subject.

FIG. 8 shows a flowchart of processing for predicting temperature where the temperature is sensed orally. Steps similar to those of FIG. 3 are designated by like reference numerals and are not described again to avoid prolixity. In this case, the prediction of temperature starts with an initial minimum setting of C=6 for the parameter C, this being effected in step 119. With an oral temperature measurement, the corrective temperature differential U may be found from the following equation, which is deemed most appropriate. The set value b used in the decision step also is chosen accordingly. U is found from:

$$U = T_p - T = -0.001t + 0.05 + C(t+1)^{-1} \quad (6 \leq C \leq 2\text{-}6) \tag{4}$$

In measuring body temperature orally in the present embodiment, computation for predicting temperature starts with the minimum value (6) of the parameter C. Therefore, when the decision rendered in step 110 is $dT_p/dt \leq -b$, the program proceeds to step 117, which calls for immediate display of "ERROR".

Figure 9:
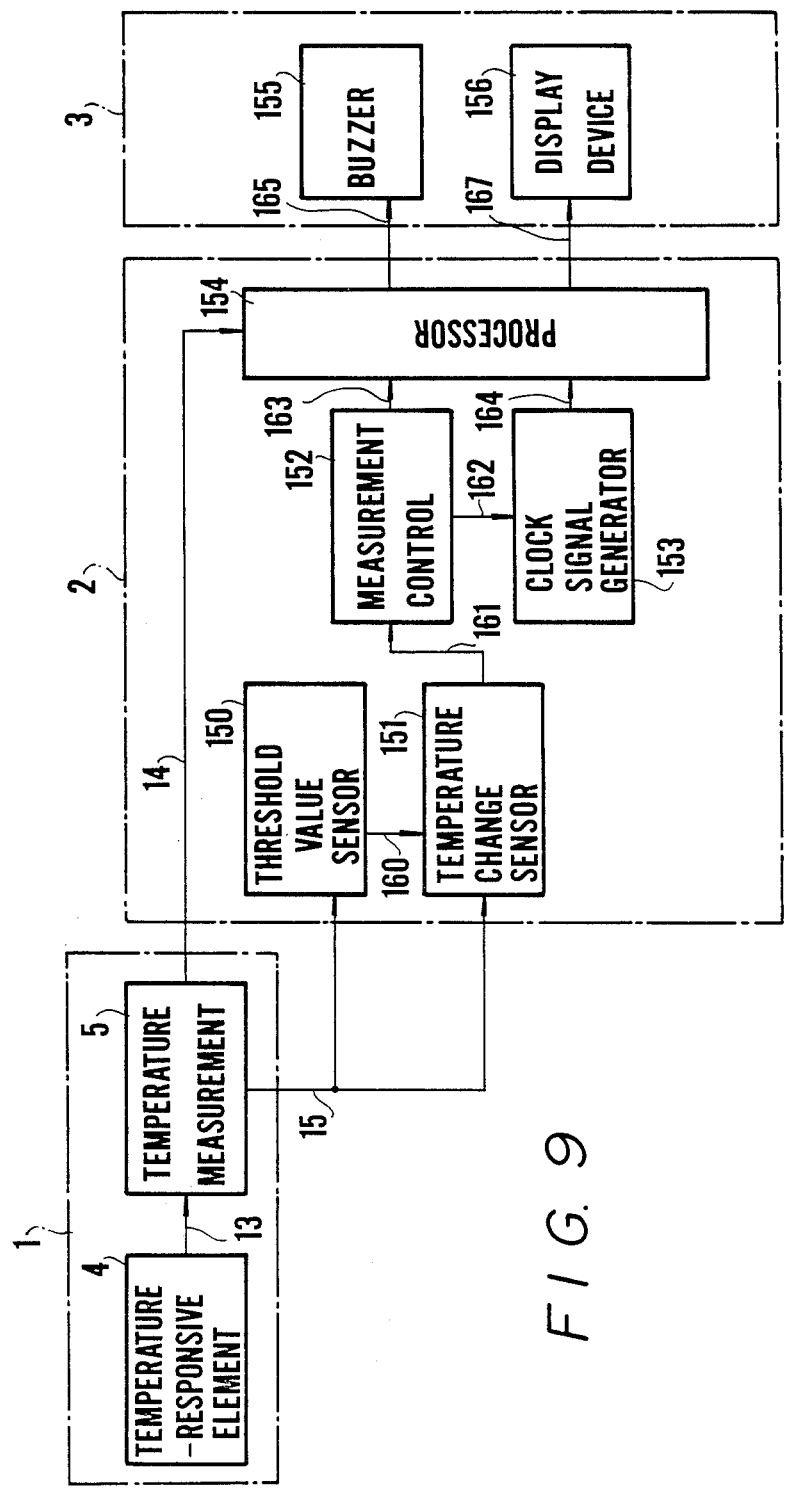
FIG. 9 is a block diagram illustrating the basic construction of an embodiment of an electronic clinical thermometer implemented using a microcomputer.

With the present state of the art, a hardware arrangement of the kind shown in FIG. 9, which makes use of a microcomputer, is well suited for implementing the complicated temperature prediction algorithm of the kind shown in FIGS. 3 and 8. Elements in FIG. 9 similar to those shown in FIG. 2 are designated by like reference numerals.

In FIG. 9, the temperature signal 14 from the temperature measuring circuit 5 is applied as an input to a processor 154 constituting part of the arithmetic unit 2. The temperature signal 15 from the temperature measuring circuit 5 is applied as an input to a temperature threshold value sensing circuit 150 and to a temperature change sensing circuit 151. The sensing circuit 150, which executes step 102, comprises a comparator for determining whether the temperature T expressed by signal 15 has exceeded a threshold temperature Tth, producing a signal 160 when such is the case. The temperature change sensing circuit 151, which executes step 103, determines whether the change in the temperature T with time, represented by signal 15, has exceeded a predetermined value k, and produces a control signal 161 when such is the case.

The control signal output 161 of the temperature change sensing circuit 151 is connected to a measurement control circuit 152. The latter produces an output 162 applied to a clock signal generating circuit 153, and an output 163 applied to the processor 154. The measurement control circuit 152 responds to the control signal 161 by actuating the clock signal generating circuit 153, and instructs the processor 154 to execute the process steps from step 105 onward. The clock pulse generating circuit 153 produces a clock pulse output 164 supplied to the processor 154, the latter responding by executing the aforementioned processing steps from step 107 onward in e.g. FIG. 3. In the illustrated embodiment the processor 154 can be realized in the form of a single-chip microcomputer.

The display unit 3 in FIG. 9 includes a buzzer circuit 155 for an audible alarm, as well as a display device 156. The buzzer 155 is for informing the user of an error condition or of the fact that suitability of a prediction has been detected. The display device 156 is for displaying the predicted display temperature.

The above-described embodiments deal with a case where the add-on value U(t) obtained from the prediction function is weighted. In general, however, when the time constant $\alpha$ for attainment of thermal equilibrium of the part of the body measured is already known, it is known that e.g. the predicted equilibrium temperature Tp is obtained in accordance with $Tp = Tt + \alpha \, dTt/dt$. Accordingly, it is permissible in such case to adopt $\alpha \, dTt/dt$ as the add-on value and subject this to weighting.

Furthermore, the weighting characteristic is not limited to a linear rise or linear decline but can define a prescribed curve.

In accordance with the invention as described above, there is provided an electronic clinical thermometer in which the displayed value of temperature rises smoothly immediately after the thermometer makes contact with the body, and in which equilibrium temperature is rapidly attained even before equilibrium temperature is sensed in real time. The displayed temperature value makes a smooth transition from a displayed value of predicted equilibrium temperature to a displayed value of sensed real-time temperature a sufficient period of time after the thermometer makes contact with the body.

As many apparently widely different embodiments of the present invention can be made without departing from the spirit and scope thereof, it is to be understood that the invention is not limited to the specific embodiments thereof except as defined in the appended claims.

What I claim is:

1. An electronic clinical thermometer comprising:
   temperature sensing means for sensing body temperature at a prescribed part of a body;
   predicting arithmetic means for predicting a final, stable temperature based on the sensed body temperature;
   arithmetic means for calculating a difference value between the sensed body temperature and the predicted final, stable temperature;
   memory means for storing a weighting function, in which elapsed measurement time is a variable, prescribing a change in weighting applied to the difference value;
   weighting means coupled to the memory means and a control means for obtaining a set of display temperatures for a plurality of sampling instants each of which display temperatures is derived by selecting a weight based on the weighing function and the elapsed time at a sampling instant, applying the selected weight to the difference value, and adding the weighted difference value to the sensed body temperature;
   said control means clocks elapsed measurement time for controllng said temperature sensing means and said weighting means at said plurality of sampling instants; and
   display means for displaying the obtained set of display temperatures.

2. The electronic clinical thermometer according to claim 1, wherein said predicting arithmetic means is coupled to the control means and stores a plurality of temperature prediction functions in which elapsed measurement time is a variable, each function prescribing a temperature change up to a final, stable temperature.

3. The electronic clinical thermometer according to claim 1, wherein the weighting function exhibits an increasing characteristic up to a weighting of 100% in an interval from the start of measurement until a first predetermined time.

4. The electronic clinical thermometer according to claim 1, wherein the weighting function exhibits an increasing characteristic up to a weighting of 100% in an interval from the start of measurement until a first predetermined time, a level characteristic wherein the weighting of 100% is maintained in an interval from the first predetermined time to a second predetermined time, and a decreasing characteristic wherein the weighting decreases from 100% to 0% in an interval from the second predetermined time to a third predetermined time.

* * * * *

UNITED STATES PATENT AND TRADEMARK OFFICE
CERTIFICATE OF CORRECTION

PATENT NO. : 4,843,577

DATED : June 27, 1989

INVENTOR(S) : MURAMOTO

It is certified that error appears in the above-identified patent and that said Letters Patent is hereby corrected as shown below:

In Column 7, line 3, change "60" to   --$\alpha$--

Signed and Sealed this

Sixth Day of June, 1995

Attest:

BRUCE LEHMAN

Attesting Officer      Commissioner of Patents and Trademarks